United States Patent [19]
Henkel et al.

[11] Patent Number: 4,966,528
[45] Date of Patent: Oct. 30, 1990

[54] APPARATUS FOR CONTROLLING THE HYDRAULIC CIRCUIT OF A PISTON DIAPHRAGM PUMP

[75] Inventors: Wolfgang E. Henkel, Hockenheim; Volker Stapelfeldt, Ratzeburg; Dietrich Belling, Büchen, all of Fed. Rep. of Germany

[73] Assignee: Abel Pumpen GmbH & Co. KG, Buchen, Fed. Rep. of Germany; a part interest

[21] Appl. No.: 307,888

[22] Filed: Feb. 8, 1989

[30] Foreign Application Priority Data

Feb. 10, 1988 [DE] Fed. Rep. of Germany ... 8801660[U]

[51] Int. Cl.$^5$ ............ F04B 21/00; F04B 35/02; F04B 43/08
[52] U.S. Cl. .................... 417/63; 417/386; 417/395; 417/478
[58] Field of Search .......... 417/377, 379, 383, 385, 417/386, 387, 388, 392, 394, 395, 397, 478, 63

[56] References Cited

U.S. PATENT DOCUMENTS

| | | | |
|---|---|---|---|
| 4,212,589 | 7/1980 | Bosio | 417/394 |
| 4,492,535 | 1/1985 | Stahlkopf | 417/394 |
| 4,565,340 | 1/1986 | Stahlkopf | 417/388 |
| 4,758,228 | 7/1988 | Williams | 417/477 |
| 4,828,464 | 5/1989 | Maier et al. | 417/385 |

FOREIGN PATENT DOCUMENTS 3121103 1/1985 Fed. Rep. of Germany ...... 417/394
3341020 5/1985 Fed. Rep. of Germany ...... 417/388

Primary Examiner—Leonard E. Smith
Assistant Examiner—John A. Savio, III
Attorney, Agent, or Firm—Vidas & Arrett

[57] ABSTRACT

An apparatus for controlling the hydraulic circuit of a piston diaphragm pump, having at least a pump diaphragm alternatingly subjected to the presure or the suction stroke of a piston operatingly connected to driving means, the apparatus comprising control means changing the amount of hydraulic medium displaced by the piston in dependence of a power demand or the like. A displacement sensor is associated with one side of the diaphragm facing the hydraulic medium, the sensor measuring the stroke travel of the diaphragm and generating a corresponding stroke travel signal which is transmitted to control means, the control means including storage means storing predetermined stroke values and/or stroke value ranges for predetermined hydraulic power values of the pump. The control means compare the stroke travel signal with the predetermined stroke values or stroke value ranges and generate a control signal if the measured stroke travel deviates from the predetermined value or value range to change the amount of hydraulic medium per time unit and/or to generate an alarm signal in dependence of the control signal.

10 Claims, 2 Drawing Sheets

APPARATUS FOR CONTROLLING THE HYDRAULIC CIRCUIT OF A PISTON DIAPHRAGM PUMP

The invention refers to an apparatus for controlling the hydraulic circuit of a piston diaphragm pump.

In piston diaphragm pumps a flexible pump diaphragm is alternatingly subjected to the pressure and the suction stroke of a driven piston, whereby the pump diaphragm in turn make stroke movements which are used for the transport of a flowable medium. The diaphragm, e.g. a flat diaphragm, a cylindrical diaphragm or a cup-shaped diaphragm can co-operate with a wall defining an end position of the diaphragm and being permeable for liquid. However, the diaphragm can be also be operated without rigid stop walls. It is known to control the hydraulic power of such piston diaphragm pumps, for example by changing the revolution per time unit of the driving means driving the piston or by changing the piston stroke. It is further known to control piston diaphragm pumps mechanically through spring-biased valves (German laying open letter No. 33 41 020) which bias controlling the amount of hydraulic medium to be introduced in a reservoir upon a pressure stroke or to be removed from the reservoir during the suction stroke in dependence of the pressure in the hydraulic circuit.

If no losses occur in the hydraulic circuit, the stroke of the piston defines the displaced mass of liquid and thus the corresponding stroke of the diaphragm. Normally, losses occur for example in the sealings for the piston rod and at the piston. Therefore, the control of the hydraulic power through the piston does not always lead to the desired result. Furthermore, the diaphragm stroke may be too large in case of oversupply due to a breakage. The normally used diaphragms allow only a limited expansion, otherwise the diaphragm may break. A breakage of the diaphragm has to be avoided if any because it leads to a stop of the pump, and the repair thereof requires a longer time duration. It must be also avoided that the hydraulic liquid and the medium to be pumped are mixed.

It is an object of the invention to provide an apparatus for controlling the hydraulic circuit of a piston diaphragm pump by which the hydraulic power of the pump can be controlled under consideration of the diaphragm stroke and/or the diaphragm stroke can be monitored with respect to a maximum expansion.

In the apparatus according to the invention, a displacement sensor is associated with the side of the diaphragm facing the hydraulic medium, the sensor measuring the stroke travel of the diaphragm and generating a stroke travel signal in accordance with the stroke travel. The stroke travel signal therefore defines directly an indicator for the hydraulic power of the diaphragm pump. This yields from the number of diaphragm strokes per time unit and the respective stroke travel of the diaphragm as well. The stroke signal is compared with a predetermined stroke value by the control means or with a predetermined stroke value range for predetermined hydraulic powers of the pump. As mentioned, the predetermined hydraulic power results from a predetermined diaphragm stroke. If the stroke is not achieved under a predetermined power demand, it is necessary to adapt the diaphragm stroke. This is accomplished by adjusting the amount of hydraulic medium in the hydraulic circuit under consideration of the control signal from the control means. If for example the diaphragm stroke is too large, it is necessary to reduce the amount of hydraulic liquid. In case the mass of hydraulic medium is too small, further hydraulic medium is to be introduced. By this, the piston diaphragm pump can be controlled in view of a constant power.

In many cases, the diaphragm pump works for a load which generates a different counterpressure in operation, for example in case of a filter press wherein a gradual pressure increase occurs. The output pressure or the power of the diaphragm pump, respectively, has to be adapted to the counterpressure relations. This the more so as for example in case of filter presses a predetermined pressure curve is desired in order to obtain an optimum effect of the filter press. Such a characterizing operation curve can be preset in the control means. The preset is carried out by a corresponding calculation into predetermined stroke values which are to be used in case of predetermined counterpressure values. For this, it is necessary to determine the counterpressure by means of a suitable pressure or pressure difference measuring and to transmit the pressure values into the control means.

By means of the travel sensor, also the maximum stroke of the diaphragm can be detected and effect an alarm signal to avoid the danger of a diaphragm breakage.

The control apparatus according to the invention can be used for all kinds of piston diaphragm pumps. It is particularly advantageous for those piston diaphragm pumps wherein the piston is operated with a constant stroke travel and a constant stroke frequency and a specific control is controlling the charging or the discharging of a storage reservoir for the hydraulic medium. If the control apparatus according to the invention is applied to such a piston diaphragm pump, controllable valves are provided through which the supply into a storage and the removal is controlled, e.g. by means of solenoid valves, the opening time thereof determining the mass of liquid removed from or led to the storage.

The travel or displacement sensor is working preferably electrically and is preferably stationarily arranged while an initiator engages the diaphragm. According to an embodiment of the invention, the initiator can be located within a sleeve which in turn is attached to a wall which determines an end position of the diaphragm. The initiator is mounted on a bolt or the like within the sleeve, the bolt engages the diaphragm by spring force to follow the movement thereof. bore of the wall. By this, the initiator is protected against the hydraulic liquid.

Variable electrical displacement sensors can be selected. Particularly advantageous is the use of a Hall generator while the initiator is a magnet. In order to protect the electrical conduits to the electrical displacement sensor, the retaining means can be defined by a tube-like housing enclosing the sensor and the electrical conduits.

The invention will be described hereinafter along with the drawings.

Figure 1:
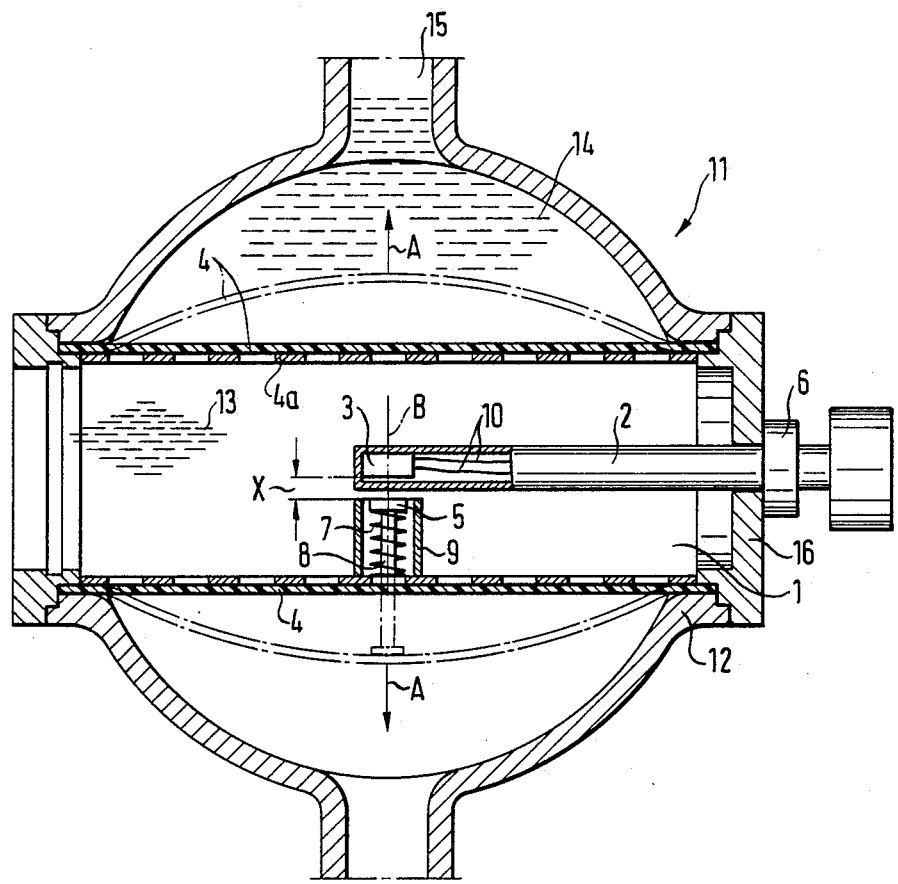
FIG. 1 shows diagrammatically a cross section through the housing of a diaphragm pump including a displacement sensor.

A diaphragm pump 11 has pump housing 12 wherein a cylindrical diaphragm 4 of suitable material is clamped (the particular kind of the attachment is not described in detail since it is known per se). The rest position of the diaphragm is shown in through lines while its maxium expansion is drawn dash-dottedly. At the inner side, the diaphragm is supported by a cylindrical perforated tube 4a. During the conveying stroke working fluid, e.g. water, flows into the inner diaphragm chamber and effects an expanson A of the diaphragm (dash-dotted line). The medium 14 to be conveyed is then pumped into the passage 15. The valves necessary for the pumping operation are not shown.

In case of a diaphragm breakage which is not recognized in time and whereafter for example aggressive medium is mixed with the working fluid expensive repair measures have to be carried out. Therefore, FIG. 1 shows a device by which the expansion of the diaphragm 4 can be detected.

In FIG. 1 preferably a flange head 6 is attached to a cover 16 for the housing. A tube 2 extends through the cover 16 into the diaphragm chamber 1. At the free end of the tube 2, a Hall generator 3 is enclosed. A magnet 5 is positioned vis-a-vis the Hall generator 3 on a common axis B.

The magnet 5 is connected to the inner side of the diaphragm 4 through a bolt 8 surrounded by a spring 7. Bolt 8, spring 7 and magnet 5 are enclosed by a sleeve which is attached to the interior of tube 2. During the diaphragm displacement, the magnet 5 is moved along axis B so that the distance X between magnet 5 and Hall generator 3 is permanently changing. Under use of the Hall effect, a permanent differential measuring of the distance X is carried out, and the generated voltage signal is transmitted outwardly through a signal cable 10 within tube 7. Thus, a reliable breakage control is achieved by for example detecting an overexpansion of the diaphragm.

Figure 2:
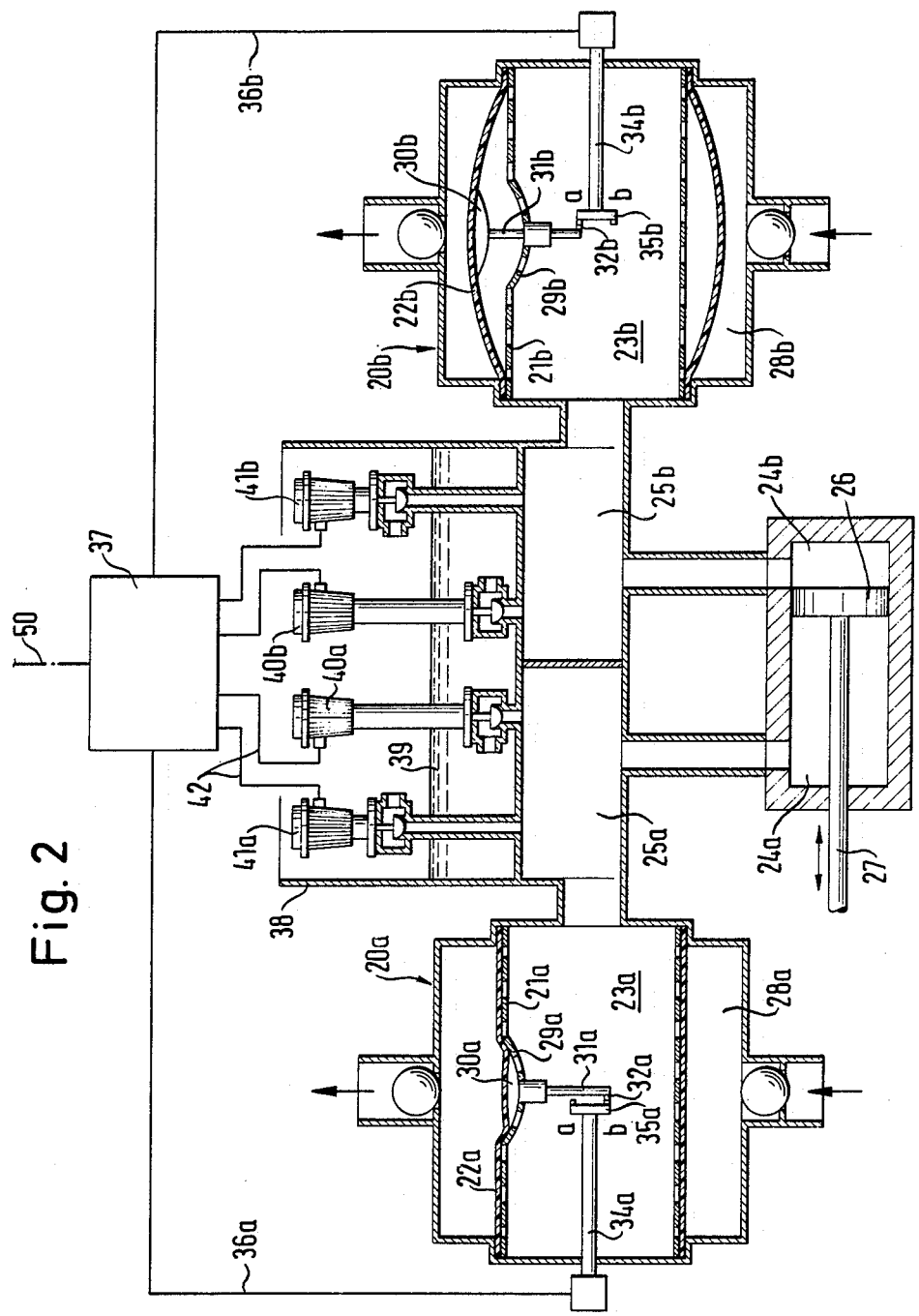
FIG. 2 shows a block diagram of a control for a twofold effective diaphragm pump.

In the embodiment according to FIG. 2 a twofold effective piston diaphragm pump is shown having two housings 20a, 20b wherein a liquid permeable tube 21a, 21b is located effecting a support for a cylindrical diaphragm 22a, 22b. The inner chamber 23a, 23b, respectively, of the diaphragm 22a, 22b, each, is connected to a piston chamber 24a, 24b through a suitable passage 25a, 25b. The piston 26 is oscillatingly driven by driving means not shown through a piston rod 27. Therefore, the diaphragm chambers 23a, 23b alternatingly are subjected to a suction or a pressure stroke, respectively, of piston 26. In the case shown the pressure stroke for diaphragm 22b and the suction stroke for diaphragm 21a has finished. The outer diaphragm chamber 28a, 28b is connected to reservoir for a medium to the pumped or with a load which is designated with the reference number 4 in FIG. 2 through suitable valve arrangements (not described in detail).

As can be seen, tube 21a, 21b has an indentation 29a, 29b. A "mushroom head" 30a, 30b can be accommodated by the indentation 29a, 29b and is connected to a rod 31a, 31b which in turn engages the inner side of the diaphragm 22a, 22b, the free end of the rod retaining an initiator 32a, 32b. As can be seen, the mushroom head 30a, 30b is within the indentation 29a, 29b at the end of the suction stroke. A tube 34a, 34b extends into the inner diaphragm chamber 23a, 23b including a displacement sensor 35a, 35b at its free end. The displacement sensor 35a, 35b is electrically operating and can be for example a Hall generator. It is clear that also other electrical displacement sensors can be used. Not shown signal conduits extend outwardly from the displacement sensor 35a, 35b through tube 34 and are connected to conduits 36a, 36b leading to a control unit 37.

A reservoir 38 includes control or working liquid 39 which can be introduced into the control liquid system of the diaphragm pumps 20a, 20b or can be removed therefrom, respectively, by means of solenoid valves 40a, 40b. Further solenoid valves 41a, 41b selectively serve for the removal or the introduction of air from or into the systems. For this purpose, the valve seats of valves 41a, 41b are located above the level of liquid 39 while the valve seats of valves 40a, 40b are immersed in the liquid 39. The valves 40a, 40b, 41a, 41b are connected to the control unit 37 through control lines 42.

Some operational modes are to be explained hereinafter.

The dispalcement sensors 35a, 35b detect the stroke movement of the diaphram 22a, 22b. This can be carried out in an analogous manner so that an analogue signal is transmitted to the control unit 37 through lines 36a, 36b. Independent therefrom the end positions a, b of the sensors can be detected which are characteristic for a predetermined maximum deflection of the diaphragm and the end of any deflection or the engagement of tube 21a, 21b, respectively. Therefore, the diaphragm movement can be determined at the end points a and b and transmitted to control unit 37. By means of the generated signals or pulses, respectively, the pumping characteristic can be held constant through a corresponding opening and closing of valves 40a, 40b, 41a, 41b or can be varied in response to a pressure by an additional pressure pulse input from load 5.

In case of a constant pumping characteristic (transport operation), a compensation of control liquid losses or of control liquid surplus has to be carried out. For the first case, the sensor 35a generates a pulse for the control unit 37 if position b is approached by which control unit 37 opens valve 40a. As long as valve 40 is opened control liquid flows from reservoir 38 into the respective hydraulic system until piston 26 has reached its end position. With arriving at this position, control valve 40a is closed.

Just before the pressure stroke is finished at position a, the displacement sensor 35b generates a pulse for the control unit 37 which then opens valve 40b. Surplus control liquid flows through valve 40b into the reservoir 38. Valve 40b remains opened until the end position of piston 26 is reached.

A mointoring of the diaphragm 22a, 22b for an overexpansion for example can be carried out such that an alarm signal is transmitted if position a is reached before piston 26 has finished its pressure stroke. Such a signal can be indicated by suitable indicating means.

In case the piston diaphragm pump of FIG. 2 is working on a load having a different counterpressure (e.g. filter press; load 5), a continuous pressure-responsive change of the control liquid is carried out under constant drive of piston 26 in that a gradual replacing of control liquid 39 by air takes place. In accordance with the desired pressure curve, valve 40a, 40b is opened upon a predetermined pressure so that control liquid escapes and the valve is closed again upon a corresponding pressure reduction. The pressure of load 5 is transmitted to control unit 37 in a manner not shown. An air displacement takes place through the opening of valves 41a, 41b just before position b has been reached and is continued upon reaching the end piston of piston 26. The conveying of the control liquid starts again when the pump is again vented by opening of the valves 40a, 40b for a predetermined time.

In case of the conveying characteristic just described the amount of control liquid between piston 26 and diaphragm 21a, 21b is changed in correspondance with the opening of the valves so that the pumped mass is changed in order to achieve a corresponding adaptation to the load.

We claim:

1. An apparatus for controlling the hydraulic circuit of a piston diaphragm pump having a pump diaphragm alternatingly subjected to the pressure or the suction stroke of a piston operatively connected to driving means, the apparatus comprising:

a displacement sensor associated with one side of said diaphragm facing said hydraulic medium, said sensor measuring the stroke travel of said diaphragm and generating a corresponding stroke travel signal, a control means for changing the amount of hydraulic medium displaced by said pistion in dependence of a power demand or the like, the control means receiving said stroke travel signal and including storage means storing a predetermined stroke value set for predetermined hydraulic powers of said pump, comparision means for comparing said stroke travel signal with said predetermined stroke value set and control signal generating means generating a control signal if said measured stroke travel deviates from said predetermined value set, and a reservoir for hydraulic medium connected to said hydraulic circuit through two valves controllable in response to said control signal, the valve seat of one valve being immersed in the hydraulic medium and selectively openable to expel the hydraulic medium from the hydraulic circuit during the piston pressure stroke and to introduce hydraulic medium into the circuit during the piston suction stroke, and the other valve having its valve seat above the level of the hydraulic medium and selectively openable to expel air from the hydraulic circuit during the piston pressure stroke and to introduce air into said circuit during the piston suction stroke, and said control means generating a control signal to selectively open the valves for limited times in correspondence with the cycle of said piston and in dependence on the stroke travel of said diaphragm.

2. The apparatus according to claim 1, wherein the amount of hydraulic medium is changed such that the diaphragm stroke remains constant.

3. The apparatus according to claim 1, wherein the amount of hydraulic medium is changed in dependence of a counterpressure at the output of said piston diaphragm pump or in accordance with a predetermined characteristic curve.

4. The apparatus according to claim 1, wherein said control means generate an alarm signal if the stroke travel reaches a maximum valve.

5. The apparatus according to claim 1, wherein said displacement sensor is a Hall generator and said initiator a magnet.

6. The apparatus according to claim 1, wherein said displacement sensor is an electrical displacement sensor is provided, an initiator engaged with said diaphram being associated with said sensor.

7. The apparatus according to claim 6, wherein said electrical sensor is mounted on a stationary support means, a sleeve is mounted on a liquid permeable support wall for said disphragm, said initicator member being located within said sleeve and being attached to a bolt biased by a spring, the bolt being in engagement with said diaphragm.

8. The apparatus according to claim 7, wherein said support means are defined by a tube-like housing accommodating said initiator or said sensor and the electrical lines therefor which are extending outwardly of the diaphragm housing.

9. The apparatus according to claim 7, wherein said support wall has an indentation adjacent the engagement location of said initiator for the accommodation of fastening parts.

10. The apparatus according to claim 9, wherein said support means are defined by a tube-like housing accommodating said initiator or said sensor and the electrical lines therefor which are extending outwardly of the diaphragm housing.

* * * * *

UNITED STATES PATENT AND TRADEMARK OFFICE
CERTIFICATE OF CORRECTION

PATENT NO. : 4,966,528
DATED : October 30, 1990
INVENTOR(S) : Henkel, Stapelfeldt, Belling It is certified that error appears in the above-identified patent and that said Letters Patent is hereby corrected as shown below:

Col. 4, line 18, delete "dispalcement" and insert

-- displacement --

Col. 4, line 50, delete "mointoring" and insert - monitoring -

Signed and Sealed this

Eighteenth Day of February, 1992

Attest:

HARRY F. MANBECK, JR.

*Attesting Officer*     *Commissioner of Patents and Trademarks*